UNITED STATES PATENT OFFICE.

HENRY ARDEN, OF LOS ANGELES, CALIFORNIA.

PROCESS OF SMELTING ORES

No. 869,043.  Specification of Letters Patent.  Patented Oct. 22, 1907.

Application filed January 9, 1907. Serial No. 351,534.

*To all whom it may concern:*

Be it known that I, HENRY ARDEN, a citizen of the United States, residing at Los Angeles, in the county of Los Angeles and State of California, have invented certain new and useful Improvements in Processes of Smelting Ores, of which the following is a specification.

This invention is a process of smelting ores and effecting reactions by the agency of a heated gas or gases constituting one of the reacting bodies and usually employed in conjunction with a larger or smaller proportion of fixed carbon. The term "ore" is used herein in its broadest sense, as including concentrates, mattes, and other metallurgical products or sources of metal.

I will describe the invention by reference to specific examples thereof, it being understood that the invention is not limited to the treatment of the particular ores mentioned by way of example, nor to the specific conditions stated.

For the reduction of iron ores I may proceed as follows: A hematite or other iron ore, usually mixed with a suitable flux and with a relatively small proportion of fixed carbon, is charged into a furnace similar in design to an ordinary blast furnace, but preferably provided with two twyers or sets of twyers at different levels, the lower set located as usual at the level of the crucible and the upper set at approximately one-third the height of the furnace above the crucible.

I may incorporate with the charge a relatively small proportion of fixed carbon, the preferred proportion being sufficient to provide the metal with the three or four percent of carbon necessary for its conversion into cast iron or pig, together with such excess as may be required to effect the reduction of any oxid which may escape reduction by the gaseous reducing agent or agents hereinafter referred to; and to compensate for any loss of carbon by oxidation in the upper portion of the furnace.

Through the upper twyers I introduce carbon monoxid previously heated to a suitable degree, the purpose of such introduction being to preheat the ore or charge, and in case the temperature of the gas is sufficient, to effect a partial reduction of the ore. With the heated carbon monoxid I may introduce a hydrocarbon, as a heavy petroleum, preferably previously vaporized and commingled with the gas, the chief purpose of such addition being to facilitate the absorption by the iron of the carbon required for making pig, and the melting of the metal. The hydrocarbon is usually admitted through the upper twyers only when the temperature of the charge in the upper portion of the furnace is sufficient to permit some reduction of the ore by carbon monoxid.

Through the lower twyers, located at the reducing zone, I admit carbon monoxid, with or without the addition of a heavy hydrocarbon vapor as above described, the carbon monoxid being superheated to such high temperature as to establish reacting conditions in the charge and to effect the reduction of the oxid. The effect of the hydrocarbon vapor is to facilitate the production of pig metal as above described. The high temperature necessary for the reduction is in practice attained by causing the carbon monoxid to traverse an electric furnace adjacent the smelting furnace, the electric furnace being preferably of the resistance type and provided with heating surfaces of carbon: in this furnace the carbon monoxid to be introduced through the lower twyers is superheated, that is to say is heated above the temperature of its formation.

In operating as above described with fixed carbon in the charge it is desirable that the gas introduced through the upper twyers be substantially free from carbon dioxid. In the reduction of iron, say from $Fe_2O_3$, carbon dioxid exerts an oxidizing effect, and a mixture of carbon monoxid and carbon dioxid containing a certain proportion of the latter gas is substantially inactive as regards reduction even though moving slowly through a body of heated ore. Accordingly it is desirable that carbon dioxid should be eliminated, and this may be accomplished by passing the gas, prior to its introduction through the upper twyers, over ignited carbon.

In practice the carbon monoxid is preferably produced by the combustion of petroleum, its heavier fractions, or other hydrocarbon in a closed furnace of suitable type, the proportion of air being regulated as nearly as practicable to yield carbon monoxid only, together with such vapor of water as may be derived from the oxidation of the hydrogen present.

In practice a certain proportion of carbon dioxid is necessarily present, to reduce which, as well as the water vapor, the gas is passed through a body of carbon in a closed receptacle or furnace, the carbon being maintained at a suitable temperature by inclusion in an electric circuit as a resister. The manner in which the hydrocarbon is vaporized is not material to my invention; the effect desired being to subject the ore to the combined reducing action of carbon monoxid and a hydrocarbon. Thus, the hydrocarbon may be vaporized in the electic furnace above described as employed for superheating the carbon monoxid; or the highly heated carbon monoxid may be utilized for spraying the hydrocarbon or for conveying its vapors into contact with the ore. I prefer however to vaporize the hydrocarbon in an independent furnace, preferably of the electric resistance type, and to convey the vapors through the superheater above described and thence into the smelting furnace. The quantity of hydrocarbon vaporized may be easily regulated by a suitable automatic feed.

In certain cases it is advisable to supply the carbon in a condition in which it will not be readily oxidized during its passage from the upper portion of the furnace to the reducing zone, while at the higher temperature of the reducing zone it will be in condition to combine with the iron and to complete the reduction of the iron oxid as above described. This result may be accomplished, for instance, by providing the carbon with a protective layer of a suitable material. I prefer to use sodium silicate, which is presumably dissociated at moderate temperatures in the upper regions of the furnace, the sodium oxid vaporizing and the silica coating the carbon in such manner as to effectively prevent its oxidation until the reduction zone is reached, or until such temperature is attained that the silica is incorporated into a slag; in such case it is advisable to construct a slag having a comparatively high heat of formation, in order to retain the protective covering until the zone of reduction is reached and until the reduction of the iron has been accomplished. The carbon may be supplied as coke, coal or other form of fixed carbon dipped or otherwise coated with sodium silicate; or dust coke or coal, peat, sawdust or the like may be agglomerated into briquets with sodium silicate as a binder. In case the fixed carbon is so protected from oxidation it is not essential in practice that the carbon monoxid be freed from carbon dioxid or other oxidizing admixture; and if the protection be complete it is possible to employ air as a heating agent, or to heat the charge by introducing through the upper twyers a combustible mixture of air and a hydrocarbon or the like.

The chief advantages of this process of reduction are its applicability in all cases where petroleum or its products are available, irrespective of the availability or expense of solid fuel; and the high purity of the product, due to the absence of any large proportion of ash or mechanical impurities derived from the reducing agent. The process is furthermore economical and effective and is readily rendered continuous.

I claim:

1. The process of smelting ores, which consists in subjecting a charge to the action of a heated gas, and then reducing the charge by means of a reducing gas heated above the temperature of its formation, substantially as described.

2. The process of smelting iron ores, which consists in subjecting a charge containing an oxid ore of iron to the action of a heated gas and then reducing the same by means of carbon monoxid heated above the temperature of its formation, substantially as described.

3. The process of smelting iron ores, which consists in subjecting a charge containing an oxid ore of iron to the action of a heated gas and then reducing the same by means of superheated carbon monoxid in presence of a hydrocarbon vapor, substantially as described.

4. The process of smelting iron ores, which consists in subjecting a charge comprising an iron ore and carbon to the action of a heated gas, then reducing the same by means of a gas heated above the temperature of its formation, substantially as described.

5. The process of smelting iron ores, which consists in subjecting a charge comprising an iron ore and carbon, the carbon being present in less proportion than would be required for reducing the ore, to the action of a heated gas, then reducing the same by means of a superheated reducing gas, substantially as described.

6. The process of smelting iron ores and producing pig metal, which consists in incorporating with an iron ore a relatively small proportion of carbon, and reducing the ore by subjecting it to the action of a reducing gas heated above the temperature of its formation, substantially as described.

7. The process of smelting iron ores and producing pig metal, which consists in incorporating with an iron ore a relatively small proportion of carbon, and reducing the ore by subjecting it to the combined action of a heated reducing gas and a hydrocarbon vapor, substantially as described.

8. The process of smelting iron ores and producing pig metal, which consists in incorporating with an iron ore a relatively small proportion of carbon, and reducing the ore by subjecting it to the combined action of heated carbon monoxid and a hydrocarbon vapor, substantially as described.

9. The process of smelting ores, which consists in heating a non-oxidizing gas to a high temperature, commingling with the same a hydrocarbon vapor, and subjecting a charge comprising the ore and carbon to the action of the mixture, substantially as described.

10. The process of smelting ores, which consists in heating a non-oxidizing gas to a high temperature, commingling with the same a hydrocarbon vapor, and subjecting a charge comprising the ore and carbon to the action of the mixture, the carbon being present in less proportion than would be required for reducing ore, substantially as described.

11. The process of smelting ores, which consists in providing a carbonaceous material with a coating capable of substantially preventing oxidation of the carbonaceous material in presence of the ore, incorporating it with an ore to be reduced, and reducing the ore by means of a heated gas, substantially as described.

12. The process of smelting ores, which consists in providing a carbonaceous material with a protective coating of sodium silicate, incorporating it with an ore to be reduced, and reducing the ore by means of a heated gas, substantially as described.

13. The process of smelting ores, which consists in providing a carbonaceous material with a coating capable of substantially preventing oxidation of the carbonaceous material in presence of the ore, incorporating it with an ore to be reduced in proportion less than would be required for reducing the ore, and reducing the ore by means of a heated gas, substantially as described.

14. The process of smelting ores, which consists in providing a carbonaceous material with a protective coating, incorporating it with an ore to be reduced, heating the charge without destroying said protective coating, and finally reducing the ore by means of a heated gas, substantially as described.

15. The process of smelting ores and producing pig metal, which consists in providing a carbonaceous material with a protective coating, incorporating it with an ore to be reduced, heating the charge without destroying said protective coating, and finally reducing the ore by means of heated carbon monoxid, substantially as described.

16. The process of smelting ores and producing pig metal, which consists in providing a carbonaceous material with a protective coating, incorporating it with an ore to be reduced, heating the charge without destroying said protective coating, and finally reducing the ore by means of heated carbon monoxid in presence of a hydrocarbon vapor, substantially as described.

In testimony whereof, I affix my signature in presence of two witnesses.

HENRY ARDEN.

Witnesses:
HARRY M. McKEE,
MAGDALEN C. FREULER.